(12) United States Patent
Van de Houten et al.

(10) Patent No.: US 9,143,422 B2
(45) Date of Patent: Sep. 22, 2015

(54) DETERMINING NETWORK NODE PERFORMANCE DATA BASED ON LOCATION AND PROXIMITY OF NODES

(75) Inventors: S Scott Van de Houten, Geneva, FL (US); Pritam Shah, Fremont, CA (US); Sanjay Sreenath, San Jose, CA (US); Preety Mordani, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 13/043,322

(22) Filed: Mar. 8, 2011

(65) Prior Publication Data

US 2012/0233308 A1    Sep. 13, 2012

(51) Int. Cl.
*G06F 15/173* (2006.01)
*H04L 12/26* (2006.01)
*H04L 12/24* (2006.01)

(52) U.S. Cl.
CPC ............... *H04L 43/12* (2013.01); *H04L 43/10* (2013.01); *H04L 41/12* (2013.01); *H04L 43/08* (2013.01)

(58) Field of Classification Search
CPC ....... H04L 43/12; H04L 67/104; H04L 12/26; H04L 15/173

USPC .......................... 709/223, 224, 238; 370/392
See application file for complete search history.

(56) References Cited

U.S. PATENT DOCUMENTS

| | | | |
|---|---|---|---|
| 7,633,942 B2* | 12/2009 | Bearden et al. ................ | 370/392 |
| 8,086,249 B1* | 12/2011 | Dinan et al. ................ | 455/456.1 |
| 8,274,905 B2* | 9/2012 | Edwards et al. .............. | 370/252 |
| 2007/0081460 A1* | 4/2007 | Karacali-Akyamac et al. ............................ | 370/230 |
| 2011/0093615 A1* | 4/2011 | Novo Diaz et al. ........... | 709/238 |

* cited by examiner

*Primary Examiner* — Vivek Srivastava
*Assistant Examiner* — Karina J Garcia-Ching
(74) *Attorney, Agent, or Firm* — Hickman Palermo Becker Bingham LLP

(57) ABSTRACT

In an embodiment, a method comprises receiving a request to obtain network performance data for a plurality of target nodes; determining geo-locations of the plurality of target nodes; based on the geo-locations, determining a set of the plurality of target nodes that are within a specified proximity radius; selecting one particular target node in the set; sending a probe packet, requesting network performance data, to the one particular target node in the set and not to all other target nodes in the set; applying, to all the target nodes in the set, network performance data that is received in response to the probe packet; wherein the method is performed by one or more processors.

18 Claims, 5 Drawing Sheets

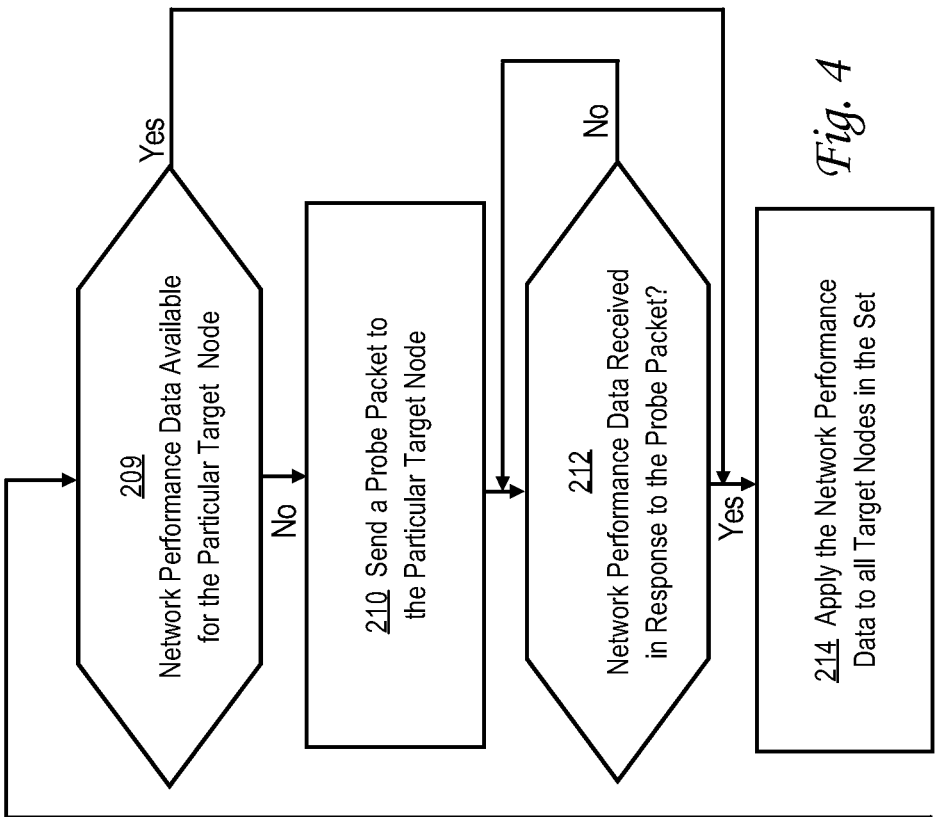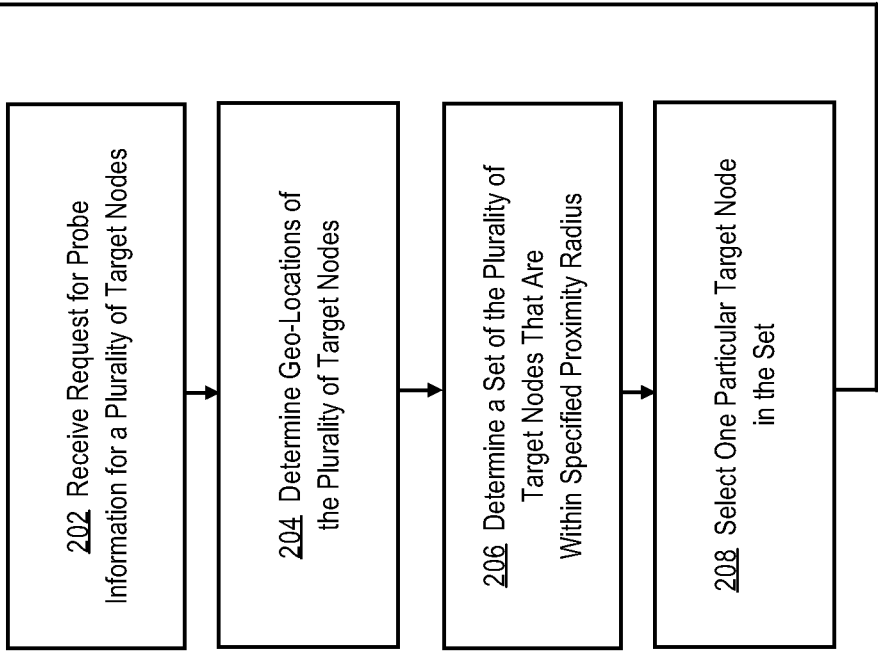
Fig. 4

DETERMINING NETWORK NODE PERFORMANCE DATA BASED ON LOCATION AND PROXIMITY OF NODES

TECHNICAL FIELD

The present disclosure is generally related to obtaining performance data from nodes in computer networks, and relates more specifically to obtaining performance data from nodes based on location.

BACKGROUND

With the growing popularity of networks that support cloud-based computing, monitoring network performance data and measuring traffic characteristics have become critical tasks in network management. Measuring path and traffic characteristics for a cloud network may be critical in resolving issues related to network load balancing and network scalability. For example, collecting and analyzing voice or video signal jitter characteristics and mean option score (MOS) values may provide quantitative and qualitative metrics helpful in managing voice and video traffic in the network.

MOS values and jitter characteristics may be collected using various methods. For example, the measurements may be collected using jitter probes. The probes may collect not only jitter characteristics and MOS values, but also impairment calculated planning impairment factor (ICPIF) data. The probes may also collect information about nodes accessibility, paths and links availability, loss of data packets, delay in delivering data packets, packet retransmission rate, and other network performance data.

Collecting network performance data may require injecting synthetic probe packets into a network and typically probe packets are sent on every network path to every network node. This may result in generating a large amount of probe traffic. Synthetic probes may be disseminated using network performance measurement tools such as Cisco IP Service Level Agreement (IPSLA) software, commercially available from Cisco Systems, Inc., San Jose, Calif.

However, injecting a significant quantity of probes into a network may overload the network or may result in an excessive network bandwidth usage. Various problems may subsequently occur when the injected probes negatively impact the network performance or when the probe traffic exceeds the capacity of links or nodes.

Furthermore, entities responsible for managing synthetic probes, such as senders of the probes and recipients of the probes, may lack the ability to process transmitted data. For example, storing network performance data for numerous target nodes may require large storage facilities.

Moreover, due to the nature and abundance of network performance data, requesting, collecting and storing network performance data for each node in a network may be neither possible nor desirable. For example, some of the collected network performance data for some nodes may never be used, and therefore sending probe packets to obtain data from such nodes may be wasteful.

BRIEF DESCRIPTION OF THE DRAWINGS

In the drawings:

FIG. 4 illustrates an embodiment of providing network performance data for a plurality of nodes;

DETAILED DESCRIPTION

Figure 1:
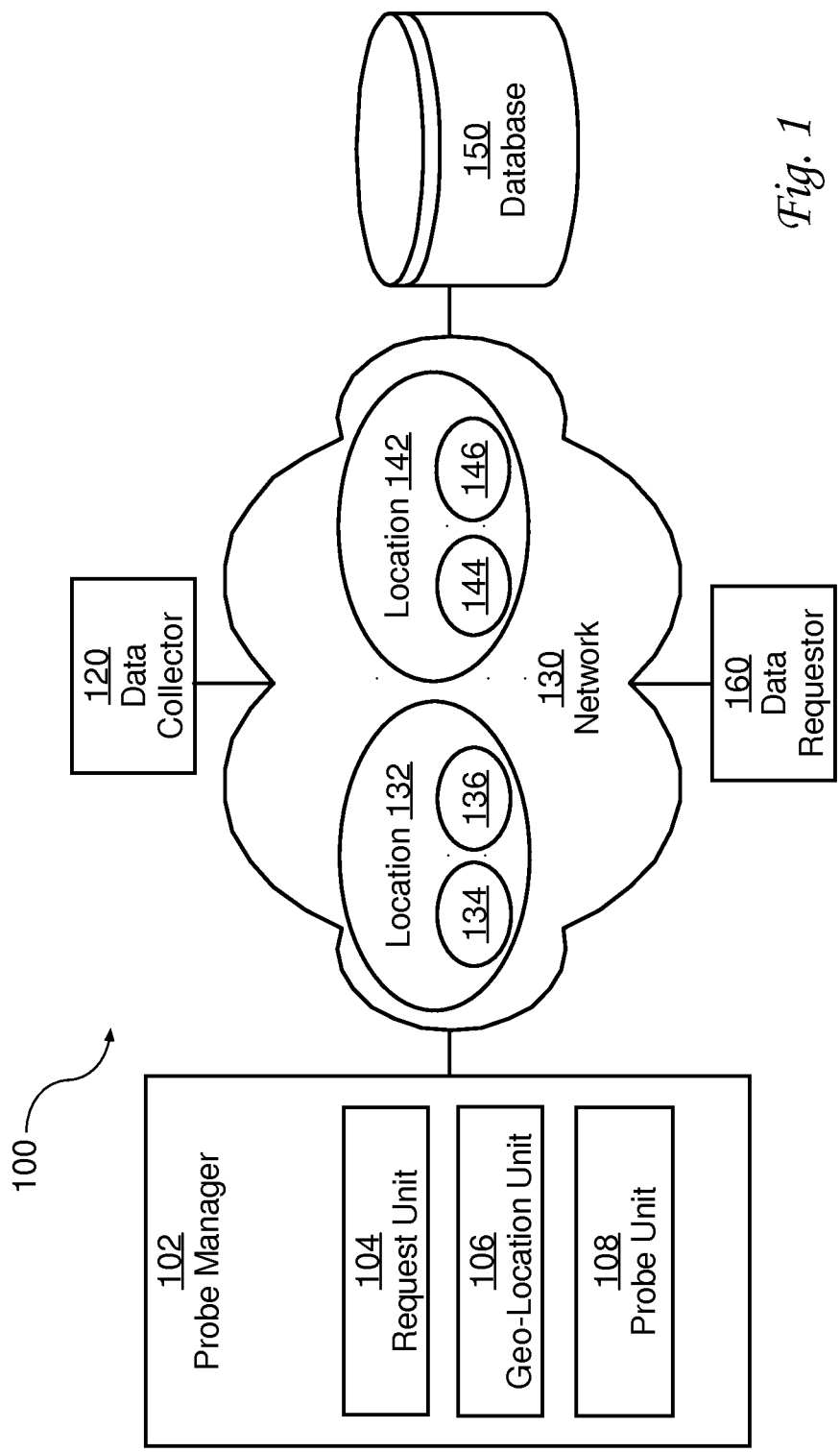
FIG. 1 illustrates an embodiment of a probe manager.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Requests for Probe Information for Target Nodes
    4.0 Determining Geo-Locations
    5.0 Collecting Network Performance Data for a Particular Target Node
    6.0 Providing Network Performance Data for Plurality of Target Nodes
    7.0 Determining Availability of Network Performance Data for a Particular Target Node
    8.0 Implementation Mechanism—Hardware Overview
    9.0 Extensions and Alternatives
    1.0 General Overview In an embodiment, the method comprises receiving a request to obtain network performance data for a plurality of target nodes and determining geo-locations of the plurality of target nodes; based on the geo-locations, determining a set of the plurality of target nodes that are within a specified proximity radius; selecting one particular target node in the set; sending a probe packet, requesting network performance data, to the one particular target node in the set and not to all other target nodes in the set; applying, to all the target nodes in the set, network performance data that is received in response to the probe packet; wherein the method is performed by one or more processors.

In an embodiment, network performance data may include jitter characteristics associated with voice traffic, jitter characteristics for video traffic, and/or any other traffic-related network performance data available at a target node.

Determining geo-locations may include determining geo-location information for a target node in the plurality of target nodes using a global positioning system (GPS), and repeating the process for each target node in the plurality of target nodes.

In an embodiment, geo-location information comprises a latitude value and a longitude value determined by a GPS for a target node. Geo-location information for a target node may be requested by a probe manager from a GPS service provider upon receiving a request for the probe information for the target node.

Alternatively, a target node may be configured to obtain its own geo-location data from the GPS service provider and advertise the geo-location data to a probe manager before a request for probe information for the target node is received by the probe manager.

In an embodiment, determining geo-location of a target node may include determining geo-location information for the target node based on an Internet Protocol (IP) address or an IP prefix of the target node.

The proximity radius may be determined arbitrarily and in advance. For example, the proximity radius may be assigned a value that corresponds to a distance measure, expressed in units such as miles, feet, kilometers, meters. The proximity radius may be used to identify a set of the plurality of target nodes that are proximate to each other and for which a distance between any two of such target nodes does not exceed the proximity radius value.

The particular target node may be selected using various criteria, such as administrative preferences, system administrator's preferences, system configurations, or network management instructions. Selecting one particular target node in a set of the target nodes may be to identify a set-representative, for which network performance data may be collected and which network performance data may be used as representative of the network performance data for each node in the set of the plurality of target nodes.

In an embodiment, by sending the request for network performance data to one particular target node, and not to all of the nodes in the set, a probe manager may be able to minimize the quantity of synthetic probes injected into the network and limit the impact of the probes on network bandwidth and other resources. Embodiments assume that target nodes in proximity to one other will provide network performance data that is representative of the network performance data for each target node in the set.

In an embodiment, the method comprises determining whether network performance data for a particular target node in the set of target nodes was collected recently or is present in storage. If stored network performance data for the particular target node is not stale, then instead of sending a probe packet to the particular target node to collect new network performance data from the particular target node, a probe manager retrieves the stored network performance data from storage.

In an embodiment, although network performance data is received from one particular target node, because the nodes in the set of the target nodes are proximate to each other, it is assumed that network performance characteristics for all target nodes in the set will be similar to the network performance data obtained for the particular target node.

Other embodiments may include computer-readable non-transitory data storage media storing instructions which, when executed, cause one or more processors to perform the foregoing method; packet routers, switches, and other network nodes that are configured to perform the foregoing method; special-purpose computers, general purpose computers, and other computing devices that are configured to perform the foregoing method.

2.0 Structural and Functional Overview

In general, the disclosure describes obtaining or determining network performance data for one particular target node in a set of a plurality of target nodes based on location and proximity, instead of obtaining determining network performance data for all the target nodes, for which network performance information was requested.

Embodiments may be used in networks featuring data servers that request and process a vast amount of network performance data. For example, the approach may be useful in various network monitoring applications, network traffic monitoring applications.

In an embodiment, network performance data may be collected for a particular target node in a set of target nodes, and the collected data may be used as representative of the network performance data for all the target nodes. For example, if a request is received for network performance data for all nodes located in a particular campus, then in an embodiment a probe packet may be sent only to one particular target node selected from the nodes that are co-located or within a specified proximity radius, instead of probing each target node and introducing a great deal of synthetic traffic.

The selection of a particular target node may be performed according to various criteria. Once the particular target node is selected, the particular node is probed for data specific to the particular target node. Upon receiving the probe information from the particular target node, the probe information is applied as network performance data to all target nodes for which network performance data were requested. The network performance data probed for one particular target node are used as representative of individual probe information of each target node indicated in the request for probe information.

The disclosed approaches may be implemented as part of Unified Operations Manager, commercially available from Cisco Systems, Inc., or other products or protocols, such as IPSLA and Optimized Performance Routing.

FIG. 1 illustrates an embodiment of a probe manager 102 in a system 100. In an embodiment, system 100 also comprises a data collector 120, a network 130, a data requestor 160 and a database 150.

For simplicity and for purposes of illustrating clear examples, FIG. 1 shows one probe manager 102, one data collector 120, one network 130, one data requestor 160 and one database 150. However, practical embodiments may use any number of probe managers 102, data collectors 120, networks 130, data requestors 160 and databases 150.

In an embodiment, network 130 is a packet-switched data network and nodes in system 100 comprise data servers, routers, switches, or other infrastructure elements; in some embodiments, the nodes may comprise database servers, data processing computers or other data collecting and data processing elements.

Probe manager 102, data collector 120, data requestor 160 and database server 150 may use hardware logic such as in an application-specific integrated circuit ("ASIC"), field-programmable gate array ("FPGA"), system-on-a-chip ("SoC") or other combinations of hardware, firmware and/or software.

In an embodiment, probe manager 102 is configured to implement a version of data transmission protocol to transmit data such as TCP. In another embodiment, probe manager 102 implements another transport layer protocol such as SCTP.

Furthermore, probe manager 102 may be configured to execute data management software applications written in various database computer languages designed for managing data in database management systems. For example, probe manager 102 may be configured to execute network management application, network monitoring application, network performance applications. Moreover, probe manager 102 may be configured to execute Software Structured Query Language (SQL) applications for managing data in relational database management systems (RDBMS).

In an embodiment, probe manager 102 is communicatively coupled with a data collector 120, data requestor 160 and database 150 via network 130.

In an embodiment, probe manager 102 comprises a request unit 104, a geo-location unit 106 and a probe unit 108. For simplicity and for purposes of illustrating clear examples, FIG. 1 shows one request unit 104, one geo-location unit 106 and one probe unit 108. However, practical embodiments may use any number of request units 104, geo-location units 106 and probe units 108.

In an embodiment, request unit 104 receives requests for network performance data, processes the requests, obtains the requested network performance data and delivers the requested network performance data to requestors. For example, request unit 104 may receive a request for network performance data from a data requestor 160, determine whether the request is valid, process the request, obtain the network performance data requested by the data requestor 160 and deliver the requested network performance to the data requestor 160.

Requests for network performance data may contain requests for data for group of target nodes or for individual target nodes. For example, request unit 104 may receive a request for network performance data for a plurality of target nodes, such as nodes located within a specific area, or nodes having the same Internet Protocol (IP) address prefix. According to another example, request unit 104 may receive a request for network performance data for an individual target node, which is identified in the request by the node's IP address, or the node's geo-location (for example, a latitude and longitude coordinate values).

While processing a network performance data request, request unit 104 may cooperate with geo-location unit 106, probe unit 108 and other components of probe manager 102. For example, request unit 104 may cooperate with geo-location unit 106 to determine geo-locations of a plurality of target nodes for which network performance data are requested.

In an embodiment, upon receiving information about a geo-location of an individual target node or geo-locations for a plurality of target nodes, request unit 104 may cooperate with probe unit 108 to obtain network performance data requested by data requestor 160 for the target node(s).

In an embodiment, upon receiving network performance data from probe unit 108, request unit 104 may deliver the network performance data to data requestor 160.

Request unit 104 repeats the process of receiving network performance data requests, processing the request, obtaining the requested network performance data and delivering the requested network performance data as the requests are queued at probe manager 102.

In an embodiment, a geo-location unit 106 determines geo-locations for an individual target node or for a plurality of target nodes. Determining a geo-location for a target node may be performed using various approaches such as requesting geo-location information from a Global Positioning System (GPS). For example, upon providing an Internet Protocol (IP) address of a target node, a GPS service provider may obtain and deliver latitude and longitude values associated with a physical location of the target node. The process may be repeated for each target node in the plurality of target nodes.

In an embodiment, geo-location unit 106 may receive advertisements of geo-locations of nodes in a network. For example, a node may request from a GPS service provider geo-location information of the node, and upon receiving such information from the GPS service provider, the node may advertise that information to other network devices, including geo-location unit 106 of probe manager 102.

In an embodiment, geo-location unit 106 may group some of the nodes of a plurality of target nodes into one or more sets. A set of target nodes may be defined based on a physical proximity between the nodes, based on the nodes' IP address prefix. For example, as depicted in FIG. 1, in network 130, geo-location unit 106 may group nodes 134 and 136 into a location 132, and nodes 144 and 146 into a location 142. Locations 132, 142 may be referred to respective sets of target nodes.

In an embodiment, each of the locations 132, 142 may comprise one or more nodes. For simplicity, FIG. 1 depicts that location 132 comprises two nodes, 134, 136, and location 142 comprises two nodes, 144, 146. However, in practical embodiments, each of locations 132, 142, may comprise any quantity of nodes. Furthermore, network 130 may comprise any quantity of locations 132, 142.

Nodes may be grouped into sets based on various criteria. For example, nodes in a set may be grouped based on a physical proximity between each two nodes in the set; thus, a location may correspond to a set. For example, two or more nodes belong to the same set if a distance between any two of the two or more nodes does not exceed a specified proximity radius.

In an embodiment, a set of target nodes may be a cluster of target nodes that are located near to each other. The degree of proximity may be specified by a proximity radius. For instance, for a given plurality of target nodes, the smaller the proximity radius is, the larger the quantity of the sets might be.

Figure 3:
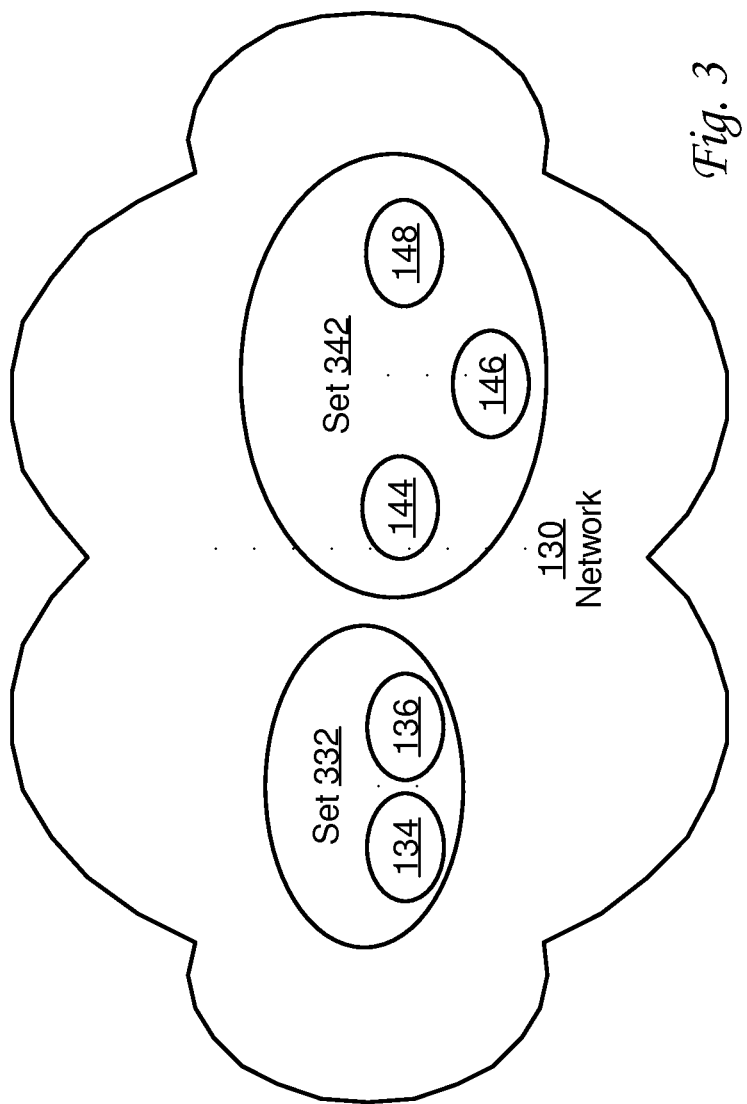
FIG. 3 illustrates sets of nodes in a network.

For example, referring again to FIG. 1, if a proximity radius is 15 units (for example, 15 miles), a physical distance between nodes 134 and 136 is 10 units, and a distance between any of 134 and 136 nodes to any of nodes 144 and 146 is 30 units, then nodes 134 and 136 may belong to set 132, and nodes 144 and 146 may belong to set 142. However, if the proximity radius is 40, then it might be possible that all nodes 134, 136, 144 and 146 belong to one large set of target nodes. Another example of node sets defined using a proximity radius is depicted in FIG. 3.

In an embodiment, nodes in a set may be grouped based on the nodes' IP address or prefix. According to other example, the nodes in a set may be grouped based on presence or membership in a physical or logical organization.

In an embodiment, geo-location unit 106 also identifies one particular target node in a set of the plurality of target nodes as a "representative" of all target nodes in the set. Geo-location unit 106 may use a variety of criteria in determining one particular target node from all the nodes in the set. For example, geo-location unit 106 may refer to system preferences, administrator's preferences or system configuration.

Upon identifying one particular target node in a set of target nodes, geo-location unit 106 may request that probe unit 108 collects network performance data only for the one particular target node of the set, but not for each target node in the set. Upon receiving network performance data for the particular target node, the network performance data may be applied to each target node in the set. By selecting one particular target node in the set and requesting network performance data merely from the particular target node, network resources may be preserved and the quantity of probes disseminated in the network may be limited.

In an embodiment, a probe unit 108 performs tasks related to collecting, storing and retrieving network connection data for an individual node and for groups of the nodes in a network. For example, probe unit 108 may receive a request for network performance data for a particular target node. Upon receiving such a request, probe unit 108 may analyze the request, and then obtain network performance data for the target node.

In an embodiment, probe unit 108 may also store network performance data obtained for a particular target node, and make the network performance data available if a request for the network performance data from the particular target node is received again by probe manager 102.

In an embodiment, probe unit 108 may also determine whether network performance data have been already collected for a particular target node, a particular geo-location or a particular group of the target nodes.

Data collector 120 may be any device capable of collecting data transmitted by entities in system 100. Data collector 120 may collect a variety of data. For example, data collector 120 may collect network performance data such as bandwidth utilization measured for communications connections, quantity of data packets transmitted and retransmitted via communications connections, a round trip time for packets transmitted via communications connections, a backbone packet loss, circuit performance data, or a level of service available at communications connections. Furthermore, data collector 120 may collect topology specific network data, including information about active nodes, failed nodes, restarted nodes, backup nodes, or standby nodes.

In an embodiment, data collector 120 may collects data related to network service calls, customer service, network repairs, or network failures.

In an embodiment, data collector 120 may also collect data generated or collected by other entities in system 100. For example, data collector 120 may collect statistical data or research result data.

In an embodiment, data collector 120 stores network performance data in a database server 150 that may be implemented in any type of data storage and configured to execute any database application, such as Software Structured Query Language (SQL) applications for managing data in relational database management systems (RDBMS).

Data requestor 160 may be any device capable of communicating with other network devices in system 100 and configured to request any type of data from other devices. For example, data requestor 160 may be coupled to a network monitoring station performing network traffic monitoring and controlling. Data requestor 160 may be also a system administrator station configured to test network performance and troubleshoot the network. Furthermore, data requestor 160 may be a user, a client application, a system application or any other type of application.

3.0 Requests for Probe Information for Target Nodes

Referring again to FIG. 1, in an embodiment, probe manager 102 receives and processes a request for network performance data for a plurality of target nodes in a network.

In an embodiment, probe manager 102 processes the request using intelligent and adaptive path probing techniques that allow reducing probing overhead without significantly reducing the accuracy of network application performance measurement data. For example, the techniques provide flexibility in controlling the amount of probe packets transmitted via the network, and thereby provide an ability to minimize bandwidth and power consumption by the devices as the network performance data are collected and delivered to the data requestor.

In an embodiment, intelligent collection and delivery of network performance data may be applicable to a variety of data communications network. For example, the approach may be applicable to voice and video traffic control, data packet traffic control, and other types of data traffic in cloud networks.

In an embodiment, network performance data may be collected using synthetic probe traffic that is selectively generated for measuring path characteristics in a cloud network.

Figure 2:
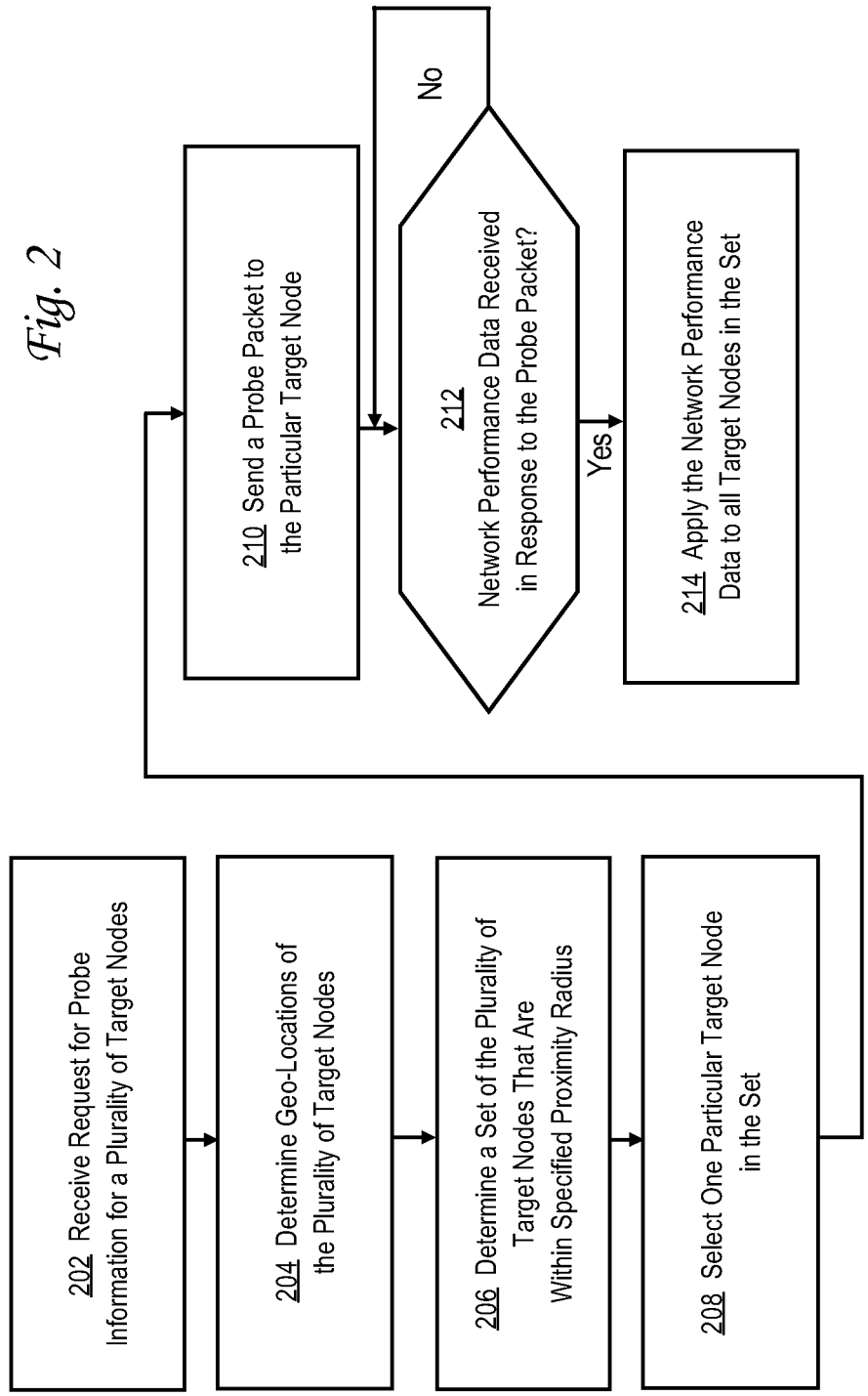
FIG. 2 illustrates an embodiment of providing network performance data for a plurality of nodes.
Figure 5:
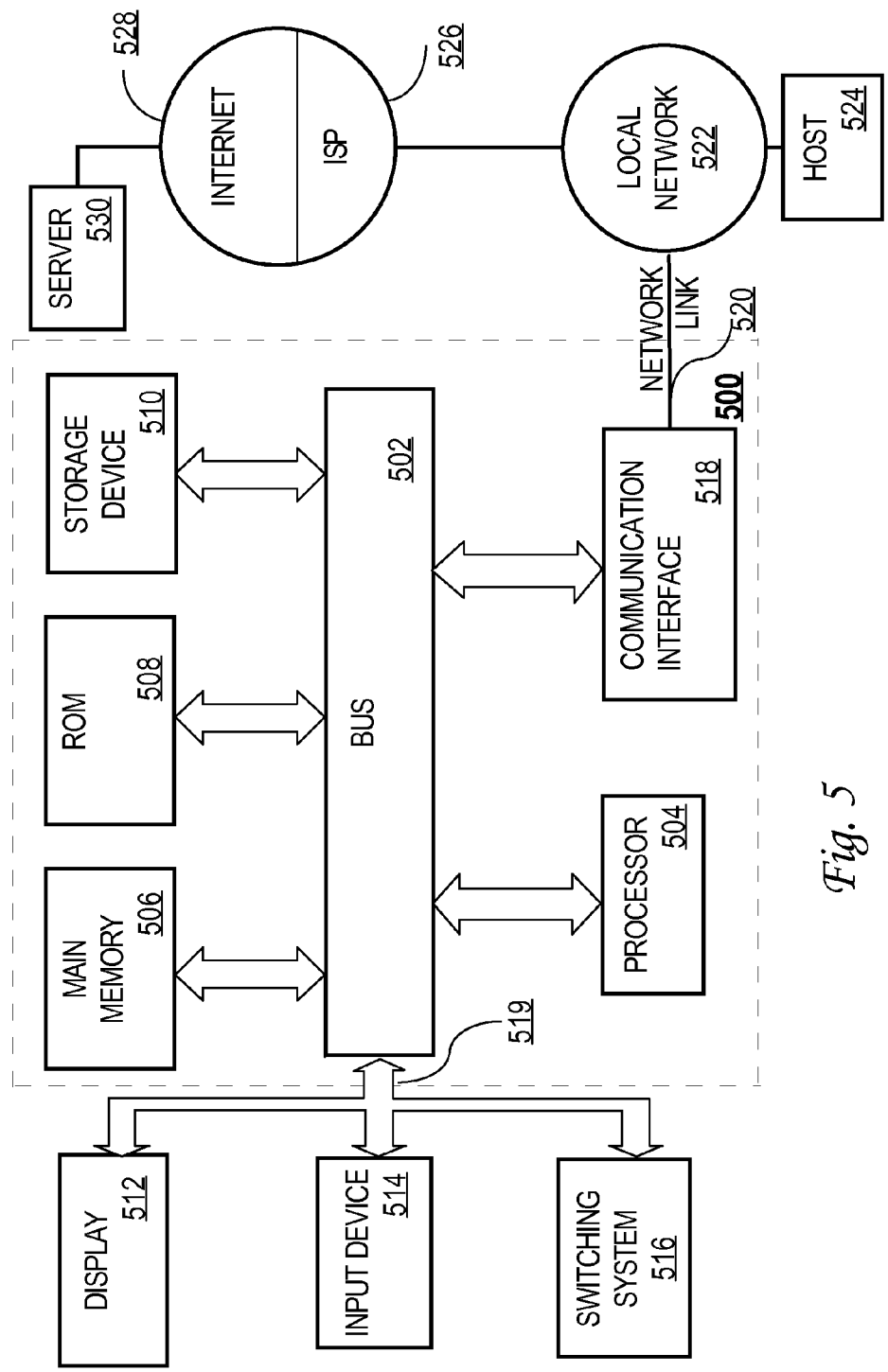
FIG. 5 illustrates a computer system upon which an embodiment may be implemented.

FIG. 2 illustrates an embodiment of providing network performance data for a plurality of nodes, FIG. 4 illustrates an embodiment of providing network performance data for a plurality of nodes, and FIG. 5 illustrates a computer system upon which an embodiment may be implemented.

Referring first to FIG. 2, in step 202, a request for probe information for a plurality of target nodes is received. The request may be received for example, from a system administrator who manually or automatically issued the request, or who launched an application requesting probe information for the plurality of target nodes. According to another example, the request may be received from a daemon application, or any other type of application launched by a system administrator, a user or a network monitoring server.

In an embodiment, a request for probe information may contain a request for various characteristics of network performance data, such as jitter characteristics for voice traffic or video traffic, bandwidth characteristics for network connections, traffic congestion characteristics, data packet re-transmission rates for network connections, delay characteristics for the network connections, data packet loss information, or information about failed nodes in the network.

In an embodiment, the request for probe information is issued for a plurality of target nodes. The nodes in the plurality of target nodes may be identified by their Internet Protocol (IP) addresses, their domain names, their logical names, or any other methods. The nodes in the plurality of target nodes may be collocated in the same geographical region, or may be located in locations that are geographically distant from each other. The nodes in the plurality of target nodes may belong to one organization, such as one company, one data center, one research laboratory, or one service provider. Alternatively, the nodes in the plurality of target nodes may belong to various organizations, companies, or data centers.

4.0 Determining Geo-Locations

Referring again to FIG. 2, in step 204, geo-locations of the plurality of target nodes are determined. In an embodiment, a geo-location may be determined for each node in the plurality of target nodes provided in the request. Alternatively, based on specified criteria, one geo-location may be determined for groups of nodes in the plurality of target nodes, and thereby resulting in determining a fewer quantity of geo-locations than the quantity of the nodes in the plurality of target nodes, for which probe information was requested.

In an embodiment, each node in a plurality of target nodes included in a request is identified by the node Internet Protocol (IP) address, or by the node IP prefix. For example, a node may be identified by its entire address (for example, 123.1.1.1), or by the node prefix (for example, 123.1.1.0/24).

In an embodiment, determining geo-location for a particular node in the plurality of target nodes is performed based on the IP address of the particular node.

There are various approaches for determining a geo-location of a node based on the node's IP address or IP prefix. Some of those approaches may be quite accurate in terms of providing an accurate geographic location of the node; others may be less accurate.

In one approach, a network node comprises a receiver for the Global Positioning System (GPS). Using the GPS receiver, the network node can determine and store data representing a geographical location of the node, or report the GPS data to a network management station. The node, or the NMS, may use the node location information that was obtained via GPS to determine whether the node is close to other nodes and to determine whether the node should receive a probe, as further described herein.

Other technologies include the Galileo global location system, the regional Beidou system of the People's Republic of China, the COMPASS global system of the People's Republic of China, the GLONASS global navigation system of Russia, the IRNSS regional navigation system of India, the QZS Japanese regional system.

In an embodiment, determining a geo-location for a particular node in the plurality of target nodes may be performed by a computer program or an application that interacts with a GPS receiver and provides a latitude value and a longitude value for the particular target node. For example, upon providing an IP address or an IP prefix of the particular node, the application may obtain latitude/longitude coordinates for the geographical location of the particular nodes and disseminate the latitude/longitude coordinates to the requestor.

In an embodiment, determining a geo-location of a particular target node is performed by using an IP address of the particular target nodes to consult a geo-location service provider. The geo-location service provider may be co-located with an IP address service provider, or may be separate from the IP address service provider servicing the particular target node. The geo-location service provider may provide a {latitude, longitude} value pair for the IP address of the particular target node. The {latitude, longitude} value pairs for the IP address of the nodes may be pre-stored in a database, or obtained each time the request for geo-location information is received.

In an embodiment, a target node in a network may be configured to store its own {latitude, longitude} value pair or to obtain the {latitude, longitude} value pair from a GPS receiver. Once the {latitude, longitude} value pair is obtained, the target node may advertise the {latitude, longitude} value pair to other network devices in the network using mechanisms such as Service Advertisement Framework (SAF), Cisco Discovery Protocol (CDP).

If such {latitude, longitude} value pairs are advertised by target nodes, entities, such as a probe source, interested in obtaining network performance data for the target nodes may subscribe to receiving such advertisements from the target nodes and obtain the geo-locations for the target nodes from the advertisements. This approach may be especially applicable for enterprise deployments, where geo-location services may not be able to resolve IP address to geographic locations.

In an embodiment, upon determining the geo-location for each node in a plurality of target nodes for which probe information has been requested, in step 206 of FIG. 2, a set of the plurality of target nodes that are within a specified proximity radius is determined.

In an embodiment, determination of a set of the plurality of target nods is based on a specified proximity radius. A proximity radius may be specified by a system administrator, a configuration file, an individual user, a system application. The specified proximity radius is a measure of a distance between the nodes in a set of nodes and allows clustering the nodes that belong to the same geographical neighborhoods. This may be performed by determining the distances between the target nodes in the plurality of target nodes, and determining whether the distances do not exceed the specified proximity radius.

In an embodiment, a specified proximity radius may be expressed using any unit of measure for distance such as miles, feet, kilometers, or meters. Alternatively, the specified proximity radius may be expressed using units of measure for time, such as time interval needed to communicate a data packet from one node to another.

FIG. 3 depicts a network 130 that has two sets of nodes, a set 332 and a set 342. Set 332 has two nodes, a node 134 and a node 136. Set 342 has three nodes, a node 144, a node 146 and a node 148. However, practical embodiments of network 130 may include any number of sets 332, 342, and any number of nodes in each set.

Upon receiving a request for network performance data for target nodes 134, 136, 144, 146 and 148, the nodes 134, 136, 144, 146 and 148 may be divided into two sets, set 332 and set 342.

In an embodiment, nodes 134, 136 are depicted as belonging to set 332 because a physical distance between node 134 and node 136 does not exceed a specified proximity radius. However, nodes 144, 146 and 148 do not belong to set 332 because their respective distances to each of the nodes 134 and 136 exceeds the specified proximity distance.

For example, assume that the distance between nodes 134 and 136 is 10 units, but the distances between each of nodes 134, 136 and each of nodes 144, 146, 148 exceed 20 units. If the specified proximity radius is 15 units, then nodes 134, 136 are proximate to each other since the distance between them does not exceed the specified proximity radius, while the nodes 144, 146, 148 are not proximate to nodes 134, 136 because they are distant from nodes 134, 136.

Continuing with the above example, nodes 144, 146 and 148 may belong to set 342 because the respective distances between nodes 144, 146 and 148 do not exceed a specified proximity radius, but the respective distances between any of nodes 144, 146 and 148 and any of nodes 134 and 136 exceed the specified proximity distance. For example, assume that the respective distances between nodes 144, 146, 148 are 10, 11, 12 units, but the distances between each of nodes 144, 146, 148 and each of nodes 134, 136 exceed 20 units. If the specified proximity radius is 15 units, then nodes 144, 146, 148 are proximate to each other since the distance between them does not exceed the specified proximity radius, while the nodes 134, 136 are not proximate to nodes 144, 146, 148 because they are distant from the nodes 144, 146, 148.

Referring again to FIG. 2, in step 208, one particular target node in the set of the plurality of target nodes is selected. As described above, the disclosed approach allows selective probing of connections and nodes in a network. Instead of probing every connection and every node for the network performance data, the approach allows the system to share active probe measurement data that were collected for one particular node within a particular set and use the network performance data collected for the particular node as representative of the network performance data of any node that belongs to the particular set.

In an embodiment, a set comprises the nodes that are proximate to each other and distant to the nodes that belong to other sets. The proximity of the nodes in the set may be determined based on a specified proximity radius, described above. Hence, the nodes that are within the specified proximity radius and that belong to the same set may share the network performance data that were collected for one particular node in the set. The probe data may be shared between all nodes in the set determined based on the geo-location.

Selecting a particular target node in a set of the plurality of target node may be determined using a variety of approaches. For example, the particular target node may be selected based on workload, functions or configuration of a node, a system administrator's preferences, network configuration, configuration of sets, a user's preferences.

5.0 Collecting Network Performance Data for a Particular Target Node

Referring again to FIG. 2, in step 210, a probe packet is sent to a particular target node selected from the nodes in a set of the plurality of target nodes, for which network performance information was requested.

The probe packet may be sent to the particular target node to collect network performance data for the particular target node. Upon receiving network performance data from the particular target node, the network performance data may be used as representative of the network performance data for all target nodes in the set, not only for the particular target node.

Referring again to FIG. 3, if probe information was requested for a plurality of target nodes 144, 146 and 148, and for example, node 144 was selected as a particular target node, the probe packet may be sent to the particular target node 144 only. This may provide more flexibility in controlling the quantity of probe packets that need to be transmitted via a network, and minimize bandwidth requirements and power consumption required to process the requests for probe information.

In an embodiment, a probe packet transmitted to a particular target node may request a variety of network performance data from the particular target node. For example, the probe may request any of the following: jitter characteristics for voice/video traffic transmitted via the particular target node, bandwidth characteristics for network connections adjacent to the particular target node, traffic congestion characteristics at the particular target node, data packet re-transmission rates for network connections adjacent to the particular target node, delay characteristics for the network connections adjacent to the particular target node, data packet loss information, information about failed nodes that were adjacent to the particular target node.

In an embodiment, in response to receiving a probe packet, a particular target node may respond by sending one or more data packets comprising data containing network performance data specific to the particular target node. The network performance data may be formatted using a variety of methods, organized in one or more data files, and provided to a probe source using various communications media.

6.0 Providing Network Performance Data for Plurality of Target Nodes

Referring again to FIG. 2, in step 212, a test is performed to determine whether network performance data are received in response to the probe packet sent in step 210, above.

If the network performance data have not been received yet, the system continues checking for the network performance data in step 212 until the network performance data are eventually received. To avoid an infinite loop in step 212, the waiting process may be terminated if the test in step 212 is performed a certain predetermined number of times, or if the waiting process was executed longer than a predetermined time duration.

If the network performance data are received in response to the probe packet, then in step 214 the received network performance data are applied to all target nodes in the set determined in step 206, as described above. The received network performance data may be stored in storage (database 150) as representative of network performance data for each of the node in the set of target nodes.

In an embodiment, the process depicted in steps 208, 210, 212 and 214 is repeated for each set of target nodes identified in step 206 of FIG. 2.

Assuming that the nodes in a set of target nodes have been selected according to valid criteria, network performance data collected for a particular target node in the set of target node may be used are representative of the network performance data for each of the target node in the set of target nodes.

7.0 Determining Availability of Network Performance Data
For A Particular Target Node Some of the approaches described in FIG. 2 assume that upon selecting a particular target node, a probe source transmits a probe packet to the particular target node to collect probe information.

However, in some situations, transmitting a probe packet to the particular target node may be unnecessary. For example, the probe information may be in a database that is accessible to the probe source, and the probe information stored in the database may be sufficiently fresh or up-to-date.

A probe source may store previously collected probe information for a particular target node in a database for a period of time and reuse the probe information when a request for the probe information for the same particular target node is received before expiration of the limited period of time.

FIG. 3 illustrates an embodiment of providing network performance data for a plurality of nodes. Steps 202, 204, 206, 208, 210, 212 and 214 of FIG. 3 correspond to like numbered steps of FIG. 2 and may be performed as described for FIG. 2.

In FIG. 3, after a request for probe information for a plurality for target nodes is received in step 202, and geo-locations of the plurality of target nodes are determined in step 204, a set of the plurality of target nodes that are within specified proximity radius is determined in step 206. Then, in step 208, one particular target node in the set of the plurality of target nodes is selected.

In step 209, a test is performed to determine whether network performance data are already available for a particular target node. If the network performance data have been already collected for the particular target node, and the network performance data are relatively up-to-date, then the process may not need to send a probe packet to the particular target node. For example, if the network performance data for the particular target node have been collected recently, for example, no longer than 5 minutes ago, then the already collected network performance data may be assumed to be relatively fresh, and the data may be reused.

In an embodiment, in step 209, the system may test whether previously collected network performance data for a particular target node is fresh enough. The test may be based on determining whether the already collected network performance data have been stored in a database for no more than a predetermined period of time, or based on determining whether no significant changes in the network performance have been noted or observed.

In an embodiment, if the already-collected network performance data is stale, then the system may disregard that data and proceed to step 210, and sent a probe packet to the particular target node. Alternatively, in step 214, the network performance data already available for the particular target node is applied to all target nodes in the set of the target nodes.

The approach of FIG. 3 provides additional mechanisms for limiting the quantity of synthetic probe packets injected into a network and provides additional opportunities for conserving power consumption and communication bandwidth in the network.

Additional methods of limiting probe-synthetic traffic and conserving network resources may be implemented by adjusting a proximity radius used to determine a set of the target nodes for which network performance data are requested. For example, by increasing the size of the proximity radius, the set may comprise more target nodes, and thus a quantity of sets for the target nodes may be reduced, causing sending a smaller quantity of probes for a given request.

8.0 Implementation Mechanism—Hardware Overview

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 518. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

According to one embodiment, compliance management is provided by computer system 500 in response to processor 504 executing one or more sequences of one or more instructions contained in main memory 506. Such instructions may be read into main memory 506 from another computer-readable storage medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 504 for execution. Such a medium may take many forms, including but not limited to, non-transitory and non-volatile storage media and non-transitory volatile storage media. Non-volatile storage media includes, for example, optical or magnetic disks, such as storage device 510. Volatile storage media includes dynamic memory, such as main memory 506.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for compliance management as described herein. The received code may be executed by processor 504 as it is received, and/or stored in storage device 510, or other non-volatile storage for later execution.

9.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
receiving a request to obtain network performance data for a plurality of target nodes;
determining geo-locations of the plurality of target nodes;
based on the geo-locations, determining a set of the plurality of target nodes consisting of set target nodes, selected from the plurality of target nodes, that are within a specified proximity distance from each other and for which a distance between any two of the set target nodes in the set does not exceed the proximity distance;
wherein a maximum physical distance, determined based on all distances between any two of the set target nodes in the set of the plurality of target nodes, does not exceed the specified proximity distance;
selecting a particular target node from the set target nodes in the set, and in said set a distance between any two of the set target nodes does not exceed the proximity distance;
sending a probe packet, requesting network performance data of the particular target node, to the particular target node in the set and not to all other set target nodes in the set;
in response to sending the request to obtain the network performance data for the plurality of target nodes:
receiving the network performance data from the particular target node, which was selected from the set target nodes in the set;
providing the network performance data, received in response to sending the probe packet to the particular target node, as representative of the network performance data for each and every node in the plurality of target nodes;
wherein the method is performed by one or more processors.

2. The method of claim 1, wherein determining geo-locations of the plurality of target nodes comprises determining geo-location information for a target node in the plurality of target nodes using a global positioning system (GPS); wherein geo-location information comprises a latitude value and a longitude value determined by the GPS for the target node and indicates a geographical location of the target node.

3. The method of claim 1, wherein determining geo-locations of the plurality of target nodes comprises determining geo-location information for a target node based on an Internet Protocol (IP) address or an IP prefix of the target node.

4. The method of claim 1, wherein sending a probe packet requesting network performance data is performed in response to determining that the network performance data for the particular target node is unavailable.

5. The method of claim 1, wherein the network performance data comprises jitter values associated with voice traffic, video traffic or any other data traffic in a cloud network; wherein the network performance data are collected using synthetic traffic generated to measure path characteristics in the cloud network.

6. The method of claim 1, wherein a target node from the plurality of target nodes is configured to obtain its geo-location data from a GPS service provider and advertise the geo-location data to a probe source.

7. A network data processing apparatus, comprising:
one or more processors;
a memory communicatively coupled to one or more processors; the memory embodying instructions that when executed by the one or more processors, cause the one or more processors to implement:
request instructions configured to receive a request to obtain network performance data for a plurality of target nodes;
geo-location instructions configured to determine geo-locations of the plurality of target nodes, and, based on the geo-locations, determine a set of the plurality of target nodes consisting of set target nodes, selected from the plurality of target nodes, that are within a specified proximity distance from each other and for which a distance between any two of the set target nodes in the set, does not exceed the proximity distance, wherein a maximum physical distance, determined based on all distances between any two of the set target nodes in the set of the plurality of target nodes, does not exceed the specified proximity distance;
probe instructions configured to:
select a particular target node from the set target nodes in the set, and in said set a distance between any two of the set target nodes does not exceed the proximity distance,
send a probe packet, to request network performance data of the particular target node, to the particular target node in the set and not to all other set target nodes in the set, and
in response to sending the request to obtain the network performance data for the plurality of target nodes:
receive the network performance data from the particular target node selected from the set target nodes in the set;
provide the network performance data, received in response to sending the probe packet to the particular target node, as representative of the network performance data for each and every node in the plurality of target nodes.

8. The apparatus of claim 7 wherein the geo-location instructions are further configured to determine geo-location information for a target node in the plurality of target nodes using a global positioning system (GPS);
wherein geo-location information comprises a latitude value and a longitude value determined by the GPS for the target node and indicates a geographical location of the target node.

9. The apparatus of claim 7, wherein the geo-location instructions are further configured to determine geo-location information for a target node based on an Internet Protocol (IP) address or an IP prefix of the target node.

10. The apparatus of claim 7, wherein the probe instructions are further configured to send a probe packet requesting network performance data in response to determining that the network performance data for the particular target node is unavailable.

11. The apparatus of claim 7, wherein the network performance data comprises jitter values associated with voice traffic, video traffic or any other data traffic in a cloud network; wherein the network performance data are collected using synthetic traffic generated to measure path characteristics in the cloud network.

12. The apparatus of claim 7, wherein a target node from the plurality of target nodes is configured to obtain its geo-location data from a GPS service provider and advertise the geo-location data to a probe source.

13. A non-transitory computer-readable storage medium storing one or more sequences of instructions which, when executed by one or more processors, cause the processors to perform:
receiving a request to obtain network performance data for a plurality of target nodes;

determining geo-locations of the plurality of target nodes;
based on the geo-locations, determining a set of the plurality of target nodes consisting of set target nodes, selected from the plurality of target nodes, that are within a specified proximity distance from each other and for which a distance between any two of the set target nodes in the set does not exceed the proximity distance;
wherein a maximum physical distance, determined based on all distances between any two of the set target nodes in the set of the plurality of target nodes, does not exceed the specified proximity distance;
selecting a particular target node from the set target nodes in the set, and in said set a distance between any two of the set target nodes does not exceed the proximity distance;
sending a probe packet, requesting network performance data of the particular target node, to the particular target node in the set and not to all other set target nodes in the set;
in response to sending the request to obtain the network performance data for the plurality of target nodes:
receiving the network performance data from the particular target node, which was selected from the set target nodes in the set;
providing the network performance data, received in response to sending the probe packet to the particular target node, as representative of the network performance data for each and every node in the plurality of target nodes.

14. The non-transitory computer-readable storage medium of claim 13, further comprising instructions which, when executed by one or more processors, cause the processors to perform: determining geo-location information for a target node in the plurality of target nodes using a global positioning system (GPS); wherein geo-location information comprises a latitude value and a longitude value determined by the GPS for the target node and indicates a geographical location of the target node.

15. The non-transitory computer-readable storage medium of claim 13, further comprising instructions which, when executed by one or more processors, cause the processors to perform: determining geo-location information for a target node based on an Internet Protocol (IP) address or an IP prefix of the target node.

16. The non-transitory computer-readable storage medium of claim 13, further comprising instructions which, when executed by one or more processors, cause the processors to perform: sending a probe packet requesting network performance data in response to determining that the network performance data for the particular target node is unavailable.

17. The non-transitory computer-readable storage medium of claim 13, wherein the network performance data comprises jitter values associated with voice traffic, video traffic or any other data traffic in a cloud network; wherein the network performance data are collected using synthetic traffic generated to measure path characteristics in the cloud network.

18. The non-transitory computer-readable storage medium of claim 13, wherein a target node from the plurality of target nodes is configured to obtain its geo-location data from a GPS service provider and advertise the geo-location data to a probe source.

* * * * *